United States Patent [19]

Engel et al.

[11] Patent Number: 4,578,052
[45] Date of Patent: Mar. 25, 1986

[54] METHOD AND APPARATUS TO DETERMINE FOLDING DEVIATIONS

[75] Inventors: Andreas Engel, Liebertwolkwitz; Frank Schumann, Machern; Werner Stiefel; Reinhold Freistedt, both of Rückmarsdorf, all of German Democratic Rep.

[73] Assignee: VEB Kombinat Polygraph "Werner Lamberz" Leipzig, Leipzig, German Democratic Rep.

[21] Appl. No.: 418,129

[22] Filed: Sep. 15, 1982

[30] Foreign Application Priority Data

Nov. 27, 1981 [DD] German Democratic Rep. ... 235195

[51] Int. Cl.⁴ .......................... B31B 49/00; B31F 1/00
[52] U.S. Cl. ........................................ 493/11; 73/159; 493/23; 493/37; 493/417
[58] Field of Search .................... 73/159; 356/375; 250/548, 571; 26/1; 493/11, 15, 417, 10, 37

[56] References Cited

U.S. PATENT DOCUMENTS

| | | | |
|---|---|---|---|
| 1,999,164 | 4/1935 | Avery | 493/11 X |
| 2,326,931 | 8/1943 | Dalton et al. | 493/11 X |
| 2,989,690 | 6/1961 | Cook | 73/159 |
| 3,035,380 | 5/1962 | Leavens | 493/11 X |
| 3,044,508 | 7/1962 | Sherman | 83/204 |
| 3,405,555 | 10/1968 | Wissinger et al. | 73/159 |
| 3,411,767 | 11/1968 | Moser et al. | 493/11 X |
| 3,417,674 | 12/1968 | Abrahamson | 493/11 |
| 3,435,240 | 3/1969 | Brunton | 73/159 X |
| 3,435,242 | 3/1969 | Kinne | 73/159 X |
| 3,498,863 | 3/1970 | Koestler | 26/1 X |
| 3,513,320 | 5/1970 | Weldon | 250/548 |
| 3,524,067 | 8/1970 | West | 250/571 |
| 3,525,872 | 8/1970 | Schneider | 250/548 |
| 3,565,532 | 2/1971 | Heitmann et al. | 356/375 |
| 3,692,414 | 9/1972 | Hosterman et al. | 356/375 |
| 3,741,081 | 6/1973 | Lutz | 493/12 X |
| 3,803,967 | 4/1974 | Leaven, Jr. | 493/22 X |
| 3,909,135 | 9/1975 | Lipkind | 356/375 X |
| 4,079,280 | 3/1978 | Kusters et al. | 331/60 X |
| 4,146,797 | 3/1979 | Nakagawa | 250/548 |
| 4,363,271 | 12/1982 | Horst | 250/548 |
| 4,467,949 | 8/1984 | Nakata | 250/571 X |

FOREIGN PATENT DOCUMENTS

| | | | |
|---|---|---|---|
| 1444796 | 5/1965 | France | 73/159 |
| 0134303 | 10/1980 | Japan | 356/375 |
| 0765473 | 1/1957 | United Kingdom | 493/11 |
| 2006952 | 5/1979 | United Kingdom | 356/375 |

OTHER PUBLICATIONS

TGL 23225 Technical Standard "Polygraphic Machines, Folding, and Apparatus" 15 pages 9/1980 Germany.
IEEE Standard Dictionary of E. Electronic Terms, 2nd Ed. May 12, 1978, Frank Jay, p. 537, TK9.15, AU246.
"Standard TGL 23225" 9/30/82, German Democratic Republic, Sixteen (16 pages), "Folding Tolerances for Folding Machines".
IBM Technical Disclosure Bulletin, vol. 23, No. 10-3/1981, "Sensing Sheet Movement", G. M. Yanker.

*Primary Examiner*—Daniel M. Yasich
*Attorney, Agent, or Firm*—Jordan and Hamburg

[57] ABSTRACT

In a method and an apparatus to test folded sheets for folding deviations from the reference folding line, to be used in pocket folding - or cutting folding machines, markings are made on the folding material, corresponding with the print format, and are sensed by sensors, preferably electro-optical reflection sensors after the material has been folded inside the machine, to obtain the position information. The evaluation position information derived from the output of the sensors for a number of folded sheets is rigid to determine the adjustments of the machine necessary to correct the deviations.

14 Claims, 6 Drawing Figures

METHOD AND APPARATUS TO DETERMINE FOLDING DEVIATIONS

The invention relates to a method and an apparatus for the testing of folded sheets of paper as to folding deviations from a reference folding line.

The testing of folding deviations in folded sheets of paper is achieved by comparing or measuring the positional deviation of the actual folding line from the reference folding line. Even at an exact setting of the paper cutter, for instance, in the fold pockets of a pocket folding machine, folding deviations necessarily occur in part of the material to be folded, since, beside other influential factors, the individual sheets to be folded have tolerance levels in their outer edge measurements and the leading edge of the sheets of paper, at the moment of folding of the paper, lie close to the paper cutter. The folding deviations occur with a certain probability and are subject to a frequency distribution for the machine technology used.

Acceptable limits for the characteristic frequency distributions, for instance, range, are predetermined for the respective products. In the German Democratic Republic Standard TGL 23255 dated September 1980 is available for the statistically proven examination of the folded sheets upon completion of the folding procedure, which is primarily used to determine the quality during machine acceptance tests. In graphic production, however, its use during production to evaluate the folding accuracy is not recommended because of the extensive time involved and the severe visual strain on the person doing the testing. The result is a subjective visual testing with limited sample size, however, taking the document location into consideration.

When determining the folding deviations, with respect to the outer edges of the sheet of paper, as it is done in the frequently used variation of the above standard, the influential force of the document location is not taken into consideration, although this is actually the reference basis for the reference folding line. Because of the above-mentioned reasons, neither method is suitable to correct the setting of a machine effectively based on precisely determined folding deviations in the initial phase of the production and during the operation, so that the changing systematic deviations and other influential factors, which arise during printing and cutting, can be optimally eliminated.

It is the object of the invention to provide a method and an apparatus for the determination of folding deviations, by means of which, in the shortest possible time, the folding quality can be determined in the initial phase of the production and during the operation to effectively correct the set machine values.

It is furthermore the object of the invention to realize a suitable measured value determination of the folding deviations from the reference folding line, depending on the document, as well as its prompt evaluation for the finished fold. This is achieved in the invention by introducing markings onto the material to be folded, the markings being coordinated with the print format, and by registering the area of these markings after the folding the material in the machine by means of sensors, preferably electro-optical reflection sensors, to obtain position information, and enabling an electronic interpretation of the obtained position information to ascertain the parameters determining the folding quality. These parameters of the frequency distribution of the length- and angle distances related to a print format oriented reference folding line are the mean value as well as statistic characteristics, such as range or standard deviation, typical for the control. The comparison of the mean value to the reference value, which comprises the systematic deviation in size and direction, is a pre-requisite for a targeted correction of the set machine values. It is further possible to identify folding deviations which lie outside the predetermined tolerance level and to sort out sheets having such deviations.

The number of folded sheets used for the evaluation is optional within reasonable limits. The evaluation takes place in the initial phase of the process after changing the format of the material to be folded to adjust the folding machine and the operating phase occasionally or continuously to control the production and if necessary, to readjust the machine in the case of changes in the systematic deviations which occur when printing, cutting and folding.

The apparatus according to the invention for the determination of folding deviations consists of sensors, preferably electro-optical reflection sensors, arranged at defined positions along the conveyor course of the sheet inside the folding machine, a control part and an electronic evaluator set-up connected thereto, with an outlet for a display device and/or for an adjoining control arrangement. Thus, pulses are registered, depending on the size of the folding distances or the speed of the material to be folded, and processed and indicated as characteristic, signed quantities and/or converted to correcting values. The electrical evaluation arrangement contains a constant memory, which makes available the constant data required for the computer calculation, counting and comparison controls as well as a display unit.

EXAMPLE OF OPERATION

The invention will be explained in greater detail in the following with the aid of two operating examples for the apparatus for performing the method for the determination of folding deviations.

The corresponding drawings show:

The folding method to be used in the processing of the printed material is known at the time of the layout of the printing format. Taking into consideration the subsequent passing of the sheets through the folding machine, the folding lines of the successive foldings are each provided with two folding markings. The following premises suffice for this arrangement:

The two markings associated with a folding line are symmetrical to the two sheet edges in the direction of motion and parallel to the reference folding line at a fixed preset distance.

The distance of both markings parallel to the reference folding line should be chosen as large as possible.

The individual markings are located completely or partly in the provided cutting area and are not included in the finished product, nor do they have a disturbing effect on the finished product.

The most simple form of marking is a rectangle of defined length and width.

One sensor that may be used is positioned in front of the other sensors, and implements the ready status of the two sensors 3 which cover the folding markings for each sheet to be folded as it leaves the folding machine.

The material 2 to be folded passes through the acquisition area of these sensors 3, whereby the folding edge changes a switch state in both of the sensors. This state does not change into another until the entering of the markings into the scannable fields. This remains for the duration of the passage of the markings. An influential factor as to the duration of both switch states is the momentary speed of the material to be folded. While the first switch state further depends on the distance between the folding edge and the marking, the second switch state is additionally determined by the width of the marking. The repetition of the switch states upon the continued passage of the material to be folded prevents final switching.

Figure 5:
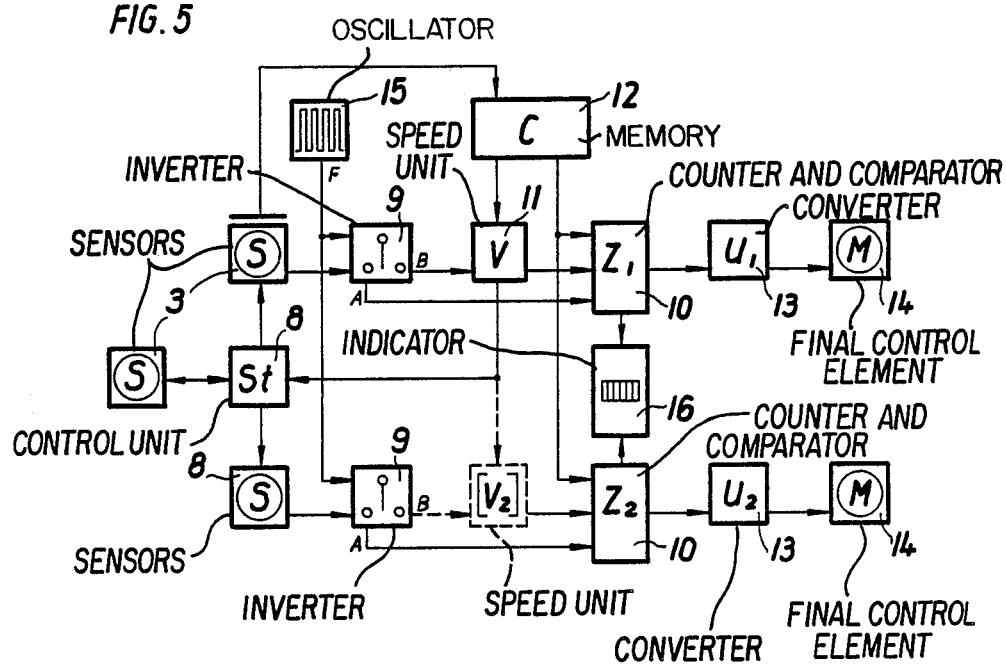
FIG. 5 shows the block diagram for the arrangement for determining folding deviations using the momentary speed of the material to be folded.

The use of the switch states to determine the folding deviations will be demonstrated in FIG. 5. When the material to be folded enters the acquisition area of the most forward of the sensors 3, i.e., the leftmost sensor 3 as shown in FIG. 5, the other two sensors 3, which are located symmetrically with respect to the middle of the inlet width of the sheet, are put on ready status by means of control unit 8. If these other sensors cover the edge folding of the sheet, the switch states are changed from B to A. This change effects a gate opening (i.e., preventing passage of pulses) via inverter 9 for a constant pulse frequency output of quartz oscillator 15, the pulses of which are registered by the counting and comparison control 10 when the gates 9 are closed. The entering of the marking imprints into the measuring ranges of these other sensors 3 results in a change of the switch states from A to B. The pulses of the quartz frequency are now registered by the counters in one or both speed units 11, until after the passage of the marking(s) another status change occurs, which ends the counting process and turns off the sensors. The speed units 11 provide from the input values: counted pulses, quartz frequency and constant marking width; information concerning the momentary speed of the material to be folded. This is used, in addition to the counted number of pulses during the switch condition A and the reference quantity from the constant memory 12 as well as information concerning the spacing of the sensors 3, to calculate the deviation of the corresponding fold in the counting and comparison apparatus 10. These can be discerned after having determined the pulse points in length- and angle deviations and displayed in indicator 16.

The deviation of every single sheet is not of interest for a subsequent correction, however, but the average deviation of the mean value of a number of sheets to be folded from the reference value is of interest. For this purpose, an average value determination is made of the stored individual deviations in the counting- and comparison apparatuses 10 or the total number of pulses, as well as a comparison with the reference value. The number of sheets, the reference value and the limit value of an acceptable tolerance level are entered via constant memory 12. The deviation of the mean value of a certain number of sheets from the reference value or the exceeding of a tolerance level is applied to display unit 16 in digital form and/or via converter 13 processed to the correcting value for a final control element 14 that influences the folding deviation. When calculating the folding deviations for the 2nd and 3rd fold the geometrical influence of the deviations of the 1st or the 1st and 2and fold is to be taken into consideration.

Figure 1:
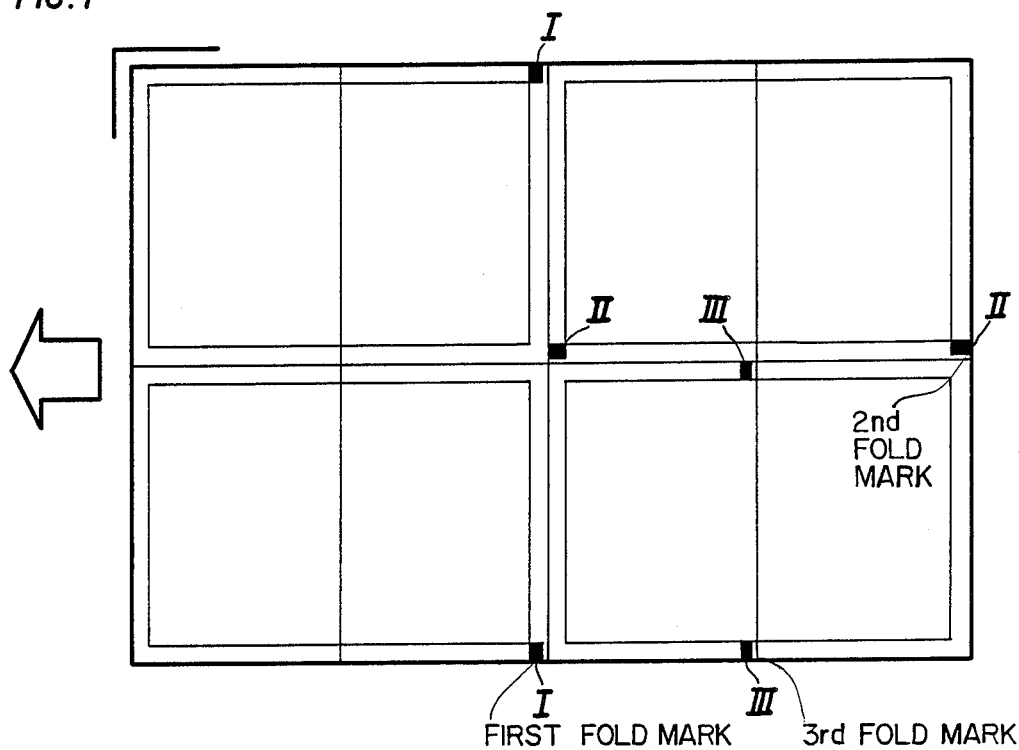
FIG. 1 shows the outer outline of a document with folding markings for the 1st to the 3rd (III) fold to be folded according to the machine folding method of the invention, in which the evaluation is dependent on the speed of the material to be folded.

FIG. 1 represents a document with folding markings, which is to be processed after the machine fold (3rd fold, intersection). The markings for the recognition of the folding deviations of the first fold (I), the second fold (II) and the third fold (III) are located on the underside of the flat sheet, entering the pocket folding machine. The scanning arrangements necessary for recognition are located above the course of the sheet after each folding process. The determination of the folding deviations of the individual folds is possible already immediately behind the fold cylinder. For this purpose, at least two sensors 3, preferably electro-optical reflection sensors, adjustable at the course of sheets in the folding machine following each folding process, are used.

Figure 3:
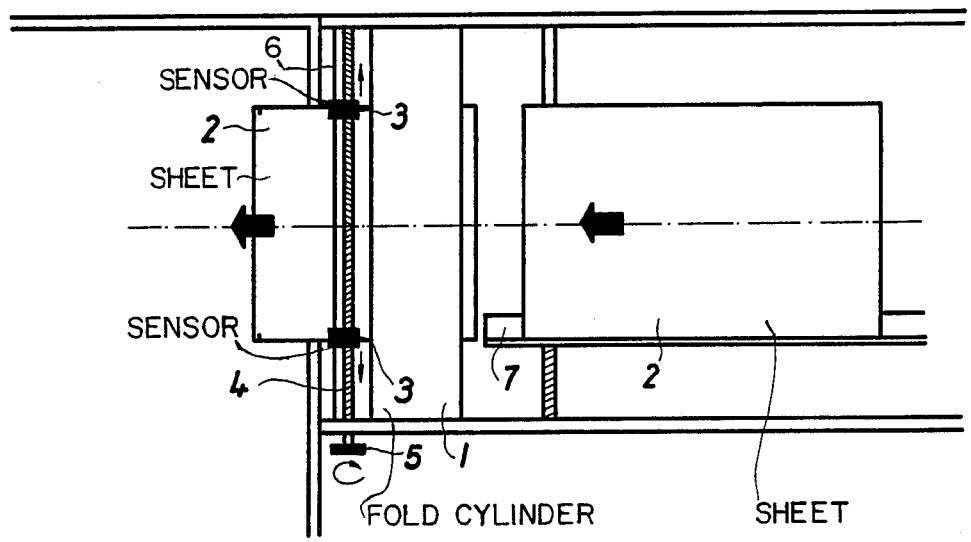
FIG. 3 shows a schematic top view of a portion of a pocket folding machine with an arrangement for the acquisition of position information of the folding markings on the material passing therethrough.

FIG. 3 represents a schematic top view of a portion of a pocket folding machine. The two mark sensing sensors 3 can be adjusted infinitely variably in the direction parallel to the fold rolls 1. Of significance is a connection between this adjustment and the guide ruler 7 of the corresponding folding mechanism with fold rolls 1. The symmetrical adjustment can, for instance, be achieved by interconnecting sensors 3, which run in a floating guide 6, with a threaded spindle 4, the thread direction of which is reversed in the middle. The adjustment of the position of sensors 3 to the width of the material 2 entering the machine to be folded can be achieved via a millimeter scale connected to the floating guide 6, by turning a handwheel 5 attached to the end of the spindle 4, and/or by using an electrical drive. The feedback of the respective position of sensors 3, which is necessary for the calculation of the folding deviations, is accomplished, for instance, by means of a linear resistance that changes, in conventional manner, as a function of position.

The design of the electronic acquisition and evaluation arrangement can be seen from the block diagram in FIG. 5. Electro-optical reflection sensors are preferably used as sensors 3. Either a constant memory 12 together with a counting and comparison arrangement 10, a speed unit 11 as well as a display unit 16 and/or converters 13 to obtain a correcting value, or a microprocessor is used to evaluate the obtained position information and to ascertain the parameter determining the quality of the folding, when evaluating the folding deviations of several folds.

Figure 4:
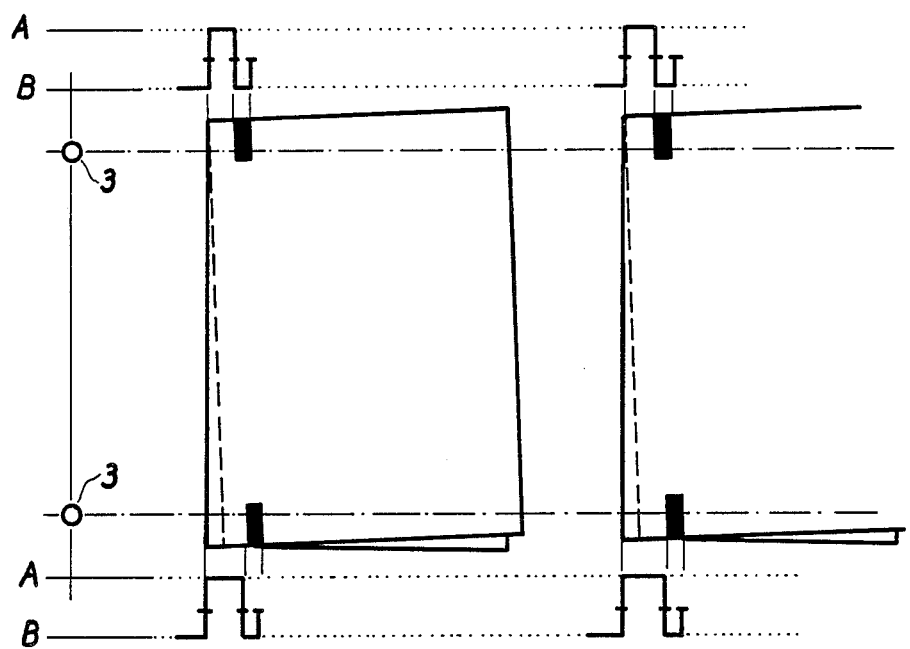
FIG. 4 shows two once folded sheets with deviations from the reference folding line and folding markings, as well as the allocated pulse lengths corresponding to a gate opening period.

FIG. 4 represents two once folded sheets, the deviations from the reference fold line of which are characterized by the distances of the folding markings to the fold edges and the distance between the sensor measuring fields. If the once folded sheets run through the acquisition area of the sensors at approximately constant speed, switch states A and B will occur in accordance with the nature of the reflection area, which are necessary as a pre-requisite for the alternate registration of pulses of the quartz frequency to determine the speed of the material to be folded or the distance of the marking from the folding edge. The electronic evaluation unit calculates, displays and/or converts the deviations of the mean value from the reference value for length- and angle deviations of the fold, and/or controls the machine based on this information. By means of the arrangement in the invention for determining folding deviations, a targeted correction of the set machine values is possible at any time without manual evaluation of the material to be folded insofar as the length and angle deviations related to a print format oriented reference folding line are concerned.

In an additional working example for the apparatus to practice the method for determining folding deviations, the measured value information is obtained almost independently of the speed of the material to be folded.

The apparatus of the folding markings corresponds by and large with the assumptions of the first example. The two markings allocated a folding line are symmetrical to the two sheet edges located in the direction of motion, however, in equal parts on both sides of the reference folding line.

Figure 2:
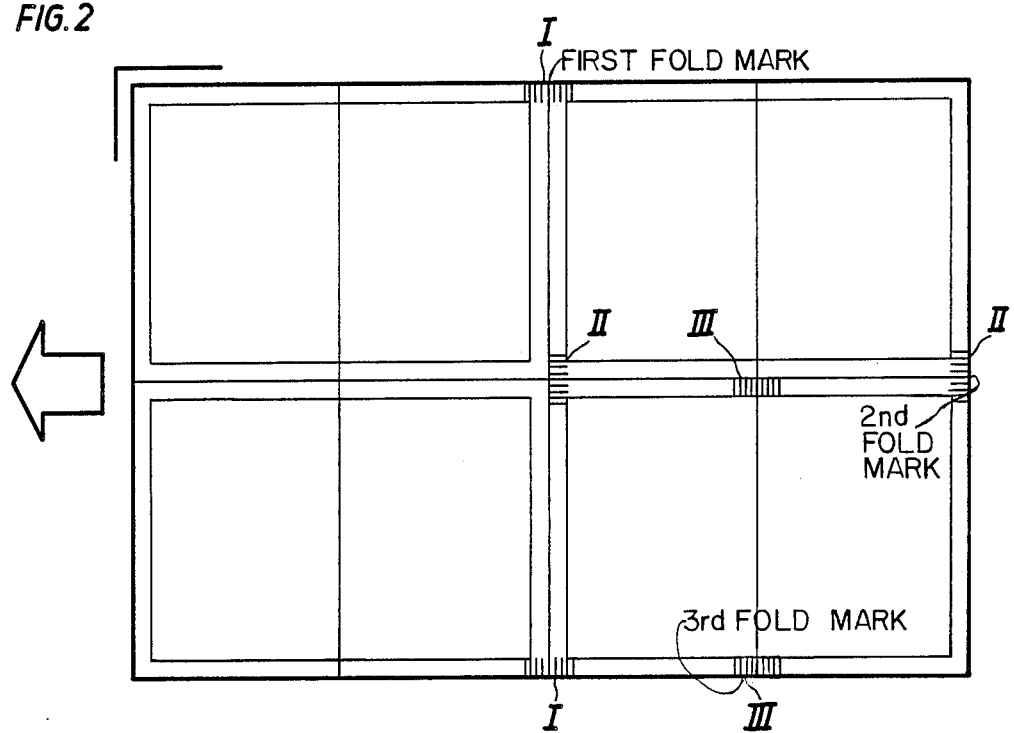
FIG. 2 shows the outer outline of a document with folding markings for the 1st to the 3rd fold to be folded according to the machine folding method of the invention, in which the evaluation is independent of the speed of the material to be folded.

The folding markings consist of a defined number of parallel lines of equal length, width, optical density at equal distances from one another, as shown in FIG. 2. After the forwardly position sensor 3 has established the ready status of the other two sensors 3 which cover the material to be folded, the material passes through their measuring area. The result of individual parallel lines of a marking, which is to be recognized after the folding process above the course of the sheets, releases a defined number of pulses. The rising or falling signal edges of these pulses are counted directly by the counters in the counting and comparison circuits 10 after corresponding amplification.

The respective last pulse is further used to interrupt the operation of the symmetrically arranged sensors 3, in accordance with circuit technology.

Figure 6:
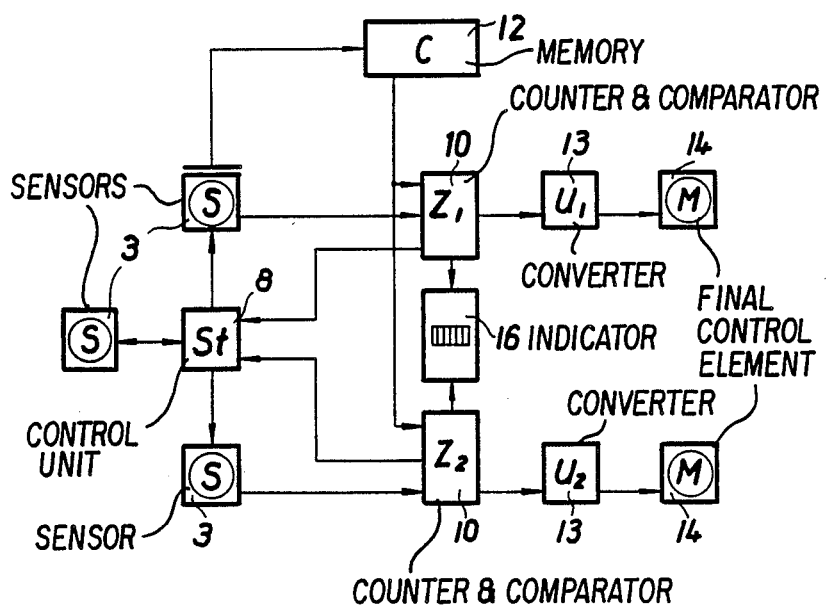
FIG. 6 shows the block diagram for the arrangement for determining folding deviations, independent of the speed of the material to be folded.

FIG. 6 shows as schematic block diagram the necessary information flow to determine the folding deviation in the second operating example as well as the elements of the arrangement. The information transferred via constant memory 12 as to the distance of sensors 3 covering the markings and values, such as reference pulse number, line width and line distance, fed into constant memory 12, as well as the pulse quantities delivered by sensors 3, enables the calculation of the folding deviations in the aggregate of the counting and comparison unit 10, which are fed as digital values to the display unit 16. If furthermore a correcting value is to be determined for a control system, the pulse quantities which are characteristic for the deviation of the individual folding sheets can be added together and divided by the number of sheets. Here, as well, the comparison of the average value of the deviations with the reference value results in a value, which is edited for the final control elements 14 by the converters 13. The speed of the material to be folded is only to be taken into consideration when choosing the sensors to be used with regard to their reaction time.

We claim:

1. Method for determining folding deviations from desired positions of folds in a material having a given print format, comprising marking a plurality of sheets of material to be folded with markings according to the print format, said markings having determined spacings from the position of the material at which it was desired that a fold be made, folding said sheets of material inside a folding machine and then sensing the respective said markings with sensors to obtain the position information of said markings, electronically evaluating the obtained position information to determine the deviation of the folding from the desired positions thereof, the step of electronic evaluation of the obtained position information comprising determining the statistical characteristics typical for the distribution of the folding deviations values, such as ranges of folding deviation values and standard deviation values and comparing said deviation to reference values for the determination of systematic folding deviations, said systematic folding deviations being dependent on the setting of the folding machine, whereby the folding machine may be adjusted in accordance with said systematic folding deviations to minimize folding deviations in subsequently folded sheets of material.

2. The method of claim 1 wherein the step of electronic evaluation comprises determining the average values of said folding deviations of a plurality of folds of sheet material.

3. Method for determining folding deviations according to claim 1, comprising making a plurality of folds in said sheets of material and evaluating the geometrical influence of the deviations of a first, or the first and second fold, etc., of the folds in determining the folding deviations of the second and third folds.

4. Method for determining folding deviations according to claim 1, further comprising sorting out said sheets of material when the folding deviations thereof exceed a predetermined extreme value.

5. The method of claim 1 wherein said step of folding comprises moving said sheet in a direction generally normal to the fold of said material formed by said step of folding said material, and said step of marking comprises providing markings on said sheet of material associated with the folding line of a fold formed by said step of folding and symmetrical to the two edges of said sheet of material in the direction of motion and parallel to said desired positions of folds, with the markings being outside of the area of said print format.

6. The method of claim 1 wherein said step of marking comprises marking said sheets with a determined number of parallel lines of equal length, width, optical density and at equal distances from one another, and extending parallel to said desired positions of folds and on opposite sides of said desired positions of folds.

7. Arrangement for determining folding deviations from a desired folding position of at least one fold in each of a plurality of sheets of material in a folding machine, wherein the sheet material has a print format and markings spaced from said desired folding position; said arrangement comprising sensors arranged inside the folding machine, said sensors being positioned to sense the position of said markings made on the sheets of material to be folded with respect to actual folding lines of the material and being connected to provide pulse outputs responsive to the sensing of said markings, and further comprising an electronic evaluation arrangement connected to determine the deviations between said actual folding lines and desired positions, comprising means for registering and processing said pulse outputs to produce a signal output corresponding to a mean value of the deviations of the folds of a plurality of sheets of said material from said desired position, a control unit responsive to said pulse outputs for applying pulses to said evaluation arrangement, final control means for adjusting the positions of folding of said folding machine, and converting means connected to receive said signal output of said evaluation means for controlling said final control means in response thereto, whereby said final control means sets said folding machine to minimize folding deviations of sheets of material subsequently folded in said folding machine.

8. Arrangement according to claim 7, wherein the electronic evaluation arrangement is comprised of a constant memory storing a reference value and counting and comparison devices connected thereto as well as a display unit coupled to said comparison device.

9. Arrangement according to claim 7, wherein the electronic evaluation arrangement is comprised of a microprocessor.

10. Arrangement for determining folding deviations according to claim 7 wherein said sensor means have two switch states and are connected to apply pulses from a quartz oscillator to said evaluation means.

11. Arrangement according to claim 7, wherein the electronic evaluation arrangement is comprised of at least a material speed determining unit, a constant memory storing a reference value and a counting and comparison device connected thereto, as well as a display unit coupled to said comparison device.

12. The arrangement of claim 7 comprising a source of pulses of constant frequency, said control unit comprising gate means responsive to the pulse outputs of said sensors for applying said pulses of said pulse source selectively to a speed determining unit and a counter for counting pulses applied thereto, a memory storing a reference value corresponding to the number of pulses of said pulse source for a determined alignment of a folding line, means applying said reference value to said speed determining unit, and means for applying the output of said speed determining unit to said counter.

13. A method for determining folding deviations of a plurality of sheets being folded from desired positions of folds in the sheets therein, said sheets having determined print formats, comprising marking the sheets according to a print format, folding the sheets in a folding machine, sensing said markings with sensors that are located within the machine and positioned to intercept the markings to obtain position information of the folds with respect to the markings, and electronically comparing the averages of the sensed position information of the markings with respect to the respective folds of a plurality of markings with predetermined reference values and evaulating the comparison results to indicate average folding deviations, whereby said folding machine may be adjusted in accordance with said indicated average folding deviations to minimize subsequent folding deviation.

14. The method of claim 13 wherein said step of marking comprises placing determined numbers of marks on opposite sides of intended fold lines, whereby the number of such markings that can be sensed by said sensors following a fold is dependent upon folding deviations.

* * * * *